(12) United States Patent
Nilsson et al.

(10) Patent No.: US 8,908,761 B2
(45) Date of Patent: Dec. 9, 2014

(54) VIDEO CODING

(75) Inventors: Mattias Nilsson, Sundbyberg (SE); Renat Vafin, Tallinn (EE); Soren Vang Andersen, Esch-Sur-Alzette (LU)

(73) Assignee: Skype, Dublin (IE)

( * ) Notice: Subject to any disclaimer, the term of this patent is extended or adjusted under 35 U.S.C. 154(b) by 539 days.

(21) Appl. No.: 13/274,803

(22) Filed: Oct. 17, 2011

(65) Prior Publication Data
US 2013/0058394 A1 Mar. 7, 2013

(30) Foreign Application Priority Data
Sep. 2, 2011 (GB) .................................. 1115209.7

(51) Int. Cl.
*H04N 7/12* (2006.01)
*H04N 11/02* (2006.01)
*H04N 11/04* (2006.01)

(52) U.S. Cl.
USPC ........... 375/240.02; 375/240; 375/12; 375/13

(58) Field of Classification Search
CPC . H04N 7/50; H04N 7/26244; H04N 7/26271; H04N 7/26053; H04N 7/26941
See application file for complete search history.

(56) References Cited

U.S. PATENT DOCUMENTS

| | | | |
|---|---|---|---|
| 6,683,988 B1 * | 1/2004 | Fukunaga et al. ............ 382/236 |
| 7,142,599 B2 | 11/2006 | Henocq | |
| 7,317,759 B1 | 1/2008 | Turaga et al. | |
| 8,180,915 B2 | 5/2012 | Zhao | |
| 8,457,202 B2 | 6/2013 | Wang et al. | |
| 8,804,836 B2 | 8/2014 | Nilsson et al. | |
| 2002/0064228 A1 | 5/2002 | Sethuraman et al. | |
| 2003/0012202 A1 | 1/2003 | Fukutomi | |
| 2004/0114817 A1 | 6/2004 | Jayant et al. | |
| 2005/0053299 A1 | 3/2005 | Fuchs et al. | |
| 2005/0135484 A1 | 6/2005 | Lee et al. | |

(Continued)

FOREIGN PATENT DOCUMENTS

| | | |
|---|---|---|
| EP | 1439712 | 7/2004 |
| EP | 2096874 | 9/2009 |

(Continued)

OTHER PUBLICATIONS

"Search Report", GB Application No. 1110759.6, (Oct. 18, 2012), 3 pages.

(Continued)

*Primary Examiner* — Dave Czekaj
*Assistant Examiner* — Nam Pham
(74) *Attorney, Agent, or Firm* — Sonia Cooper; Jim Ross; Micky Minhas

(57) ABSTRACT

A method comprising: encoding a video image at each of a plurality of frames, including by using inter frame encoding to encode at least portions of some of the frames, thereby generating an encoded video stream; transmitting the encoded video stream over a lossy channel to be decoded at a receiver to produce decoded video; and performing a recovery operation to refresh the encoding of the video image, cutting off error propagation that has occurred in the decoded video due to an effect of inter prediction in presence of loss over said channel; wherein the recovery operation is triggered by a report fed back from the receiver indicative of loss; and wherein the recovery operation is performed over a plural number of frames, refreshing the encoding of different partial frame regions at different respective frames.

29 Claims, 7 Drawing Sheets

(56) References Cited

U.S. PATENT DOCUMENTS

| | | |
|---|---|---|
| 2005/0213657 A1 | 9/2005 | Kodama et al. |
| 2005/0237987 A1 | 10/2005 | Wang et al. |
| 2006/0056338 A1 | 3/2006 | Abe et al. |
| 2006/0239348 A1 | 10/2006 | Zhang |
| 2006/0291558 A1 | 12/2006 | Schreier |
| 2007/0030894 A1 | 2/2007 | Tian et al. |
| 2007/0160137 A1 | 7/2007 | Guo et al. |
| 2008/0112481 A1 | 5/2008 | Hsaing et al. |
| 2008/0247469 A1 | 10/2008 | Vadapalli et al. |
| 2008/0310502 A1 | 12/2008 | Kim et al. |
| 2009/0067495 A1 | 3/2009 | Au et al. |
| 2009/0086816 A1 | 4/2009 | Leontaris et al. |
| 2009/0086827 A1 | 4/2009 | Wu et al. |
| 2009/0190661 A1 | 7/2009 | Nagori |
| 2009/0219991 A1 | 9/2009 | Po et al. |
| 2009/0252227 A1 | 10/2009 | Konrad et al. |
| 2010/0161329 A1 | 6/2010 | Chung et al. |
| 2010/0226262 A1 | 9/2010 | Liu et al. |
| 2010/0238997 A1 | 9/2010 | Yang et al. |
| 2010/0239015 A1 | 9/2010 | Wang et al. |
| 2010/0278275 A1 | 11/2010 | Yang et al. |
| 2010/0303148 A1 | 12/2010 | Hiron |
| 2010/0316126 A1 | 12/2010 | Chen et al. |
| 2011/0080952 A1 | 4/2011 | Vadapalli et al. |
| 2011/0090960 A1 | 4/2011 | Leontaris et al. |
| 2011/0119565 A1 | 5/2011 | Chang et al. |
| 2011/0164677 A1 | 7/2011 | Lu et al. |
| 2011/0206119 A1 | 8/2011 | Bivolarsky et al. |
| 2011/0286516 A1 | 11/2011 | Lim et al. |
| 2012/0069927 A1 | 3/2012 | Oyman et al. |
| 2012/0093017 A1 | 4/2012 | Liu et al. |
| 2012/0327997 A1 | 12/2012 | Nilsson |
| 2012/0327998 A1 | 12/2012 | Nilsson |
| 2012/0328002 A1 | 12/2012 | Vafin |
| 2013/0044804 A1 | 2/2013 | Nilsson |
| 2013/0058395 A1 | 3/2013 | Nilsson |
| 2013/0058405 A1 | 3/2013 | Zhao |
| 2013/0223513 A1 | 8/2013 | Chen et al. |

FOREIGN PATENT DOCUMENTS

| | | |
|---|---|---|
| EP | 2184925 | 5/2010 |
| EP | 2230849 | 9/2010 |
| GB | 2167267 | 5/1986 |
| GB | 2492329 | 1/2013 |
| JP | 10145794 | 5/1998 |
| WO | WO-2004004359 | 1/2004 |
| WO | WO-2006042323 | 4/2006 |
| WO | WO-2007015126 | 2/2007 |
| WO | WO-2007084475 | 7/2007 |
| WO | WO-2012171113 | 12/2012 |

OTHER PUBLICATIONS

"Search Report", GB Application No. 1110763.8, (Oct. 18, 2012), 3 pages.

"Search Report", GB Application No. 1110760.4, (Oct. 24, 2012), 4 pages.

"Search Report", GB Application No. 1114323.7, (Dec. 10, 2012), 3 pages.

"International Search Report and Written Opinion", Application No. PCT/US2012/053581, (Dec. 11, 2012),14 pages.

"International Search Report and Written Opinion", Application No. PCT/US2012/053850, (Dec. 5, 2012),12 pages.

"International Search Report and Written Opinion", Application No. PCT/US2012/053583, (Dec. 5, 2012),13 pages.

"International Search Report and Written Opinion", Application No. PCT/US2012/051507, (Dec. 17, 2012),13 pages.

Alwihaibi, Abdullah et al., "Computation of the Residual Packet Loss Probability in a Binary Multicast Tree", (2003),4 pages.

Chen, Chih-Ming "Error Resilience Transcoding Using Prioritized Intra-Refresh for Video Multicast Over Wireless Networks", (2005), 4 pages.

Naghdinezhad, Amir et al., "Distortion Estimation for Reference Frame Modification Methods", *19th European Signal Processing Conference (EUSIPCO 2011)*, (2011), 5 pages.

Stockhammer, Thomas et al., "Rate-Distortion Optimization for JVT/H.26L Video Coding in Packet Loss Environment", *International Workshop on Packet Video, 2002*, (Apr. 24, 2002),12 pages.

Vadapalli, Sarat C., "Low-Complexity Frame-Level Joint Source-Channel Distortion Optimal, Adaptive Intra Refresh", *2008 IEEE 10th Workshop on Multimedia Signal Processing*, (2008), pp. 474-480.

Vadapalli, Sarat C., et al., "Efficient Alternative to Intra Refresh Using Reliable Reference Frames", *International Conference on Multimedia and Expo, 2007 IEEE*, (2007), 4 pages.

Zhang, Yuan et al., "Joint Source-Channel Rate-Distortion Optimization for H.264 Video Coding Over Error-Prone Networks", (2007), pp. 445-454.

Zhang, Yuan et al., "Optimum End-to-End Distortion Estimation for Error Resilient Video Coding", (2004), 4 pages.

"International Search Report and Written Opinion", Application No. PCT/EP2012/062163, (Aug. 7, 2012), 15 pages.

"International Search Report and Written Opinion", Application No. PCT/EP2012/062164, (Jul. 30, 2012), 14 pages.

"International Search Report and Written Opinion", Application No. PCT/EP2012/062162, (Aug. 7, 2012), 17 pages.

Chao, Yi-Chih et al., "An Approximate Square Criterion for H.264/AVC Intra Mode Decision", *Multimedia and Expo. 2888 IEEE International Conference on. IEEE*. Piscataway. NJ. USA, (Jun. 23, 2008), pp. 333-336.

Chen, Quqing et al., "Attention-Based Adaptive Intra Refresh for Error-Prone Video Transmission", *video transmission, IEEE Communications Magazine, IEEE Service Center*, Piscataway, US, vo 1 . 44, No. 1, (Jan. 1, 2007), pp. 52-60.

Lim, Keng-Pang et al., "JM text: Description of Joint Model Reference Encoding Methods and Decoding Concealment Methods", *24. JVT Meeting; 81. MPEG Meeting*; 29.6.2887-5.7.2886; Geneva. CH;*(Joint Video Team of ISO/IEC JTC1/SC29/WG11 and ITU-T SG . 16*, (Jul. 3, 2007), 58 pages.

Liu, Meng et al., "Rate Control Based on Intermediate Description", *Visual Communications and Image Processing*; Jul. 11, 2010-Jul. 14, 2010; Huang Shan, An Hu I , China, (Jul. 11, 2012), 10 pages.

Nyamweno, S et al., "Error Resilient Video Coding Via Weighted Distortion", *Multimedia and Expo, 2009. ICME 2009. IEEE International Conference On, IEEE*, Piscataway, NJ, USA, (Jun. 28, 2009), pp. 734-737.

Rolin, Ruan "A Novel Intra Refreshment Algorithm For ROI", *Multimedia and Information Technology, 2008. MMIT '08. International Conference On, IEEE*, Piscataway, NJ, USA, (Dec. 30, 2008), pp. 62-65.

Sarwer, Mohammed G., et al., "Enhanced Low Complex Cost Function for H.264/AVC Intra Mode Decision", *Multimedia and Signal Processing (CMSP). 2811 International Conference On. IEEE*, (May 14, 2011), pp. 46-50.

Song, Mingzhou et al., "Motion Estimation in DCT Domain", *IEEE*, vol. 5, (1996), pp. 670-674.

Sullivan, Gary J., et al., "Rate-Distortion Optimization for Video Compression", *IEEE Signal Processing Magazine*, 15(6), (Nov. 1, 1998), pp. 74-90.

Wang, Yi et al., "Off-Line Motion Description for Fast Video Stream Generation in MPEG-4 AVC/H.264", *2006 IEEE International Conference On Multimedia and Expo (ICME 2006)*, Toronto, Ont., Canada, IEEE, Piscataway, NJ, USA, (Jul. 1, 2006), pp. 685-688.

Wiegand, Thomas et al., "Error Resilient Video Transmission Using Long-Term Memory Motion-Compensated Prediction", *IEEE Journal on Selected Areas in Communications, IEEE Service Center*, Piscataway, US, val. 18, No. 6, (Jun. 1, 2000), pp. 1050-1062.

Xiong, Bing et al., "A New Multiplication-Free Block Matching Criterion", *IEEE Transactions On Circuits and Systems For Video Technology. IEEE Service Center*. Piscataway. NJ. US. vo 1 . 18. No. 18, (Oct. 1, 2008), pp. 1441-1446.

Zhang, Yuan et al., "Error Resilience Video Coding in H.264 Encoder with Potential Distortion Tracking", *Image Processing, 2004. ICIP '04. 2004 International Conference on Singapore Oct. 24-27, 2004*, Piscataway, NJ, USA,IEEE, val. 1, (Oct. 24, 2004), pp. 163-166.

(56) References Cited

OTHER PUBLICATIONS

"Final Office Action", U.S. Appl. No. 13/275,046, May 22, 2014, 22 pages.
"Final Office Action", U.S. Appl. No. 13/274,881, Mar. 18, 2014, 32 pages.
"Non-Final Office Action", U.S. Appl. No. 13/274,739, Nov. 20, 2013, 14 pages.
"Non-Final Office Action", U.S. Appl. No. 13/274,922, Jan. 16, 2014, 18 pages.
"Non-Final Office Action", U.S. Appl. No. 13/275,046, Jan. 16, 2014, 21 pages.
"Non-Final Office Action", U.S. Appl. No. 13/274,865, Jan. 7, 2014, 24 pages.
"Non-Final Office Action", U.S. Appl. No. 13/274,904, Nov. 12, 2013, 25 pages.
"Non-Final Office Action", U.S. Appl. No. 13/274,881, Dec. 19, 2013, 29 pages.
"Notice of Allowance", U.S. Appl. No. 13/274,739, Jan. 9, 2014, 4 pages.
"Search Report", GB Application No. 1115201.4, (Feb. 12, 2013), 3 pages.
"Search Report", GB Application No. 1115209.7, (Feb. 12, 2013), 3 pages.
"Final Office Action", U.S. Appl. No. 13/274,922, Jul. 16, 2014, 23 pages.
"Final Office Action", U.S. Appl. No. 13/274,865, Jul. 18, 2014, 24 pages.
"Non-Final Office Action", U.S. Appl. No. 13/274,904, Jun. 16, 2014, 32 pages.
"Non-Final Office Action", U.S. Appl. No. 13/274,881, Jul. 2, 2014, 37 pages.
"Final Office Action", U.S. Appl. No. 13/274,881, Sep. 16, 2014, 43 pages.
Girod, et al.,' "Feedback-Based Error Control for Mobile Video transmission", Proceedings of the IEEE, 87 (10), Oct. 1999, 17 Pages.

\* cited by examiner

| $D_{ep}(1(1))$ | $D_{ep}(1(2))$ | $D_{ep}(2(1))$ | $D_{ep}(2(2))$ | $D_{ep}(3(1))$ | $D_{ep}(3(2))$ | $D_{ep}(4(1))$ | $D_{ep}(4(2))$ |
|---|---|---|---|---|---|---|---|
| $D_{ep}(1(3))$ | $D_{ep}(1(4))$ | $D_{ep}(2(3))$ | $D_{ep}(2(4))$ | $D_{ep}(3(3))$ | $D_{ep}(3(4))$ | $\underline{D_{ep}(4(3))}$ | $D_{ep}(4(4))$ |
| $D_{ep}(5(1))$ | $\underline{D_{ep}(5(2))}$ | $D_{ep}(6(1))$ | $D_{ep}(6(2))$ | $D_{ep}(7(1))$ | $D_{ep}(7(2))$ | $D_{ep}(8(1))$ | $D_{ep}(8(2))$ |
| $D_{ep}(5(3))$ | $D_{ep}(5(4))$ | $D_{ep}(6(3))$ | $D_{ep}(6(4))$ | $D_{ep}(7(3))$ | $D_{ep}(7(4))$ | $D_{ep}(8(3))$ | $D_{ep}(8(4))$ |
| $D_{ep}(9(1))$ | $D_{ep}(9(2))$ | $D_{ep}(10(1))$ | $D_{ep}(10(2))$ | $\underline{D_{ep}(11(1))}$ | $\underline{D_{ep}(11(2))}$ | $D_{ep}(12(1))$ | $D_{ep}(12(2))$ |
| $D_{ep}(9(3))$ | $D_{ep}(9(4))$ | $\underline{D_{ep}(10(3))}$ | $D_{ep}(10(4))$ | $D_{ep}(11(3))$ | $\underline{D_{ep}(11(4))}$ | $D_{ep}(12(3))$ | $D_{ep}(12(4))$ |
| $D_{ep}(13(1))$ | $D_{ep}(13(2))$ | $D_{ep}(14(1))$ | $D_{ep}(14(2))$ | $D_{ep}(15(1))$ | $D_{ep}(15(2))$ | $D_{ep}(16(1))$ | $\underline{D_{ep}(16(2))}$ |
| $D_{ep}(13(3))$ | $D_{ep}(13(4))$ | $D_{ep}(14(3))$ | $D_{ep}(14(4))$ | $D_{ep}(15(3))$ | $D_{ep}(15(4))$ | $\underline{D_{ep}(16(3))}$ | $D_{ep}(16(4))$ |

FIG. 4

VIDEO CODING

RELATED APPLICATION

This application claims priority under 35 U.S.C. §119 or 365 to Great Britain Application No. GB 1115209.7, filed Sep. 2, 2011. The entire teachings of the above application are incorporated herein by reference.

TECHNICAL FIELD

The present invention relates to the transmission of encoded video over an erroneous channel.

BACKGROUND

A stream of video data to be encoded is illustrated schematically in FIG. 1a. The stream comprises multiple frames (F) each representing the video image at a different respective moment in time. As will be familiar to a person skilled in the art, for the purpose of encoding, each frame (F) is divided into portions and each portion may also be subdivided into smaller sub-portions, each portion or sub-portion comprising a plurality of pixels. For example, according to one terminology each frame of a video stream to be encoded is divided into macroblocks (MB) and each macroblock is subdivided into blocks or subblocks (b), each block or subblock comprising multiple pixels. Each frame may also be divided into independently decodable slices (S), each slice comprising one or more macroblocks. N.B. the divisions shown in FIG. 1a are only schematic for illustrative purposes and it will be appreciated that these are not necessarily meant to correspond to any actual encoding scheme—e.g. each frame is likely to contain a larger number of macroblocks.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction can typically be performed from pixels in video frames other than the current frame (inter prediction) and from pixels in the same frame (intra prediction). That is, if encoded using intra frame encoding then a block, subblock or other portion of the frame (the target block or portion) is encoded relative to another block, subblock or image portion in the same frame (the reference block or portion); and if encoded using inter frame encoding then the target block or portion is encoded relative to a reference block or portion in another frame. This process is commonly referred to as prediction or prediction coding. The inter or intra prediction module will thus generate a prediction, e.g. in the form of an indication of a neighbouring block or subblock in the case of intra frame encoding and/or a motion vector in the case of inter frame encoding. Typically the encoder also generates a residual signal representing a "left over" difference between the predicted block and the actual block (or predicted and actual subblocks, etc.). The residual, motion vectors and any required data associated with the intra prediction are then output into the encoded video stream, typically via further coding stages such as a quantizer and entropy encoder. Hence most blocks in the video can be encoded in terms of a difference between blocks, which requires fewer bits to encode than encoding absolute pixel values and hence saves on bitrate. Intra prediction encoding typically requires more bits than inter prediction, though still represents a saving over encoding absolute values. Details of suitable inter and intra encoding techniques for video will be familiar to a person skilled in the art.

An example of intra coding is illustrated schematically in FIG. 1b, and an example of inter encoding is illustrated schematically in FIG. 1c. In intra coding pixels from above or/and to the left of the target block or subblock b (all within the same frame) are used for prediction of the pixels of the target block or subblock. This process is called intra prediction. In addition, the residual from the intra prediction may also be transformed, quantized and entropy coded. In the inter encoding example, the pixels of a target block or sub-block b1 are predicted based on a corresponding area in the previous frame, offset from the target block or sub-block b1 by the motion vector (with the possibility of being offset by a fractional number of blocks or even a fractional number of pixels). This process is called inter prediction. The residual from the inter prediction may also be transformed, quantized and entropy coded similar to the intra prediction residual.

Modern codecs allow the use of different prediction encoding modes for different portions within a frame. The possibility of having different coding options increases the rate-distortion efficiency of a video codec. The optimal coding representation has to be found for every frame region. Typically, such region is a macroblock, e.g. of 16×16 pixels. I.e. so it is possible for an intra prediction or inter prediction mode to be selected individually for each macroblock, so that different macroblocks within the same frame can be encoded with different modes. It is also possible in some codecs to use different modes based on different levels of partitioning of macroblocks, e.g. selecting between a higher complexity mode in which a separate prediction is performed for each 4×4 subblock within a macroblock or a lower complexity mode in which prediction is performed based on only 8×8 or 8×16 blocks or even whole macroblocks. The available modes may also include different options for performing prediction. For example as illustrated schematically in FIG. 1b, in one intra mode the pixels of a 4×4 subblock (b) may be determined by extrapolating down from the neighbouring pixels from the subblock immediately above, or by extrapolating sideways from the subblock immediately to the left. Another special prediction mode called "skip mode" may also be provided in some codecs, which may be considered as an alternative type of inter mode. In skip mode (PSkip) the target's motion vector is inferred based on the motion vectors to the top and to the left and there is no encoding of residual coefficients. The manner in which the motion vector is inferred is consistent with motion vector prediction, thus the motion vector difference is zero and so it is only required to signal that the macroblock is a skip block.

A coding representation may thus include block partition information, prediction mode, motion vector, quantization accuracy, etc. The optimal coding option depends on video content, bit rate, earlier coding decisions, etc. The accuracy of quantization of transform coefficients is typically chosen to meet a bit rate constraint. Furthermore, distortion should be minimized.

For example, the H.264 video coder provides a great flexibility in choosing the prediction mode. For inter prediction of the luma component, a macroblock of 16×16 pixels can be represented as one block of 16×16 pixels, or two blocks of 16×8 pixels, or two blocks of 8×16 pixels, or four blocks of 8×8 pixels. Further, an 8×8 block can be represented as one block of 8×8 pixels, or two subblocks of 8×4 pixels, or two subblocks 4×8 pixels, or four subblocks of 4×4 pixels. The inter prediction is tried for each allowed partition of a macroblock. The inter prediction of a block is represented by indexing the reference frame(s) and the motion vector(s) (spatial shift from the reference block in the respective reference frame), which typically are estimated with sub-pixel precision. For intra prediction of the luma component, there are four possible modes for 16×16 blocks and nine possible modes for 4×4 subblocks. Further, there are four possible modes for chroma components. The best prediction mode is chosen by comparing the performance of inter and intra prediction modes.

The rate-distortion performance of a video codec such as H.264 AVC depends to a large extent on the performance of the macroblock mode selection o. That is, the procedure of determining whether the macroblock is best encoded, in terms of rate-distortion trade-offs, using e.g. intra mode or inter mode. From a robustness perspective, intra coded macroblocks are beneficial since they stop temporal error propagation (assuming the use of constrained intra prediction, i.e. intra prediction from inter predicted macroblocks is prohibited). However, intra coded macroblocks are generally more expensive in terms of rate compared to inter coded macroblocks, and thus it is important to introduce intra coded macroblocks systematically such that the distortion (e.g. average distortion) at the decoder is minimized given a certain bit budget and channel condition. Zhang et al., "Error resilience video coding in H.264 encoder with potential distortion tracking", (Proc. IEEE International Conference on Image Processing, pp. 163-166, 2004) (incorporated herein by reference in its entirety) propose such a systematic framework to introduce intra coded macroblocks based on the minimization of the expected average sum of squared differences (SSD) at the decoder. By tracking the potential distortion Zhang et al are able to compute a bias term related to the expected error-propagation distortion (at the decoder) that is added to the source coding distortion when computing the cost for inter macroblocks within the encoder rate-distortion loop.

The rate-distortion optimization (RDO) problem can be formulated in terms of minimizing distortion under a bit rate constraint R. A Lagrangian optimization framework is often used to solve the problem, according to which the optimization criterion may be formulated as:

$$J=D(m,o)+\lambda R(m,o), \quad (1)$$

where J represents the Lagrange function, D represents a measure of distortion (a function of mode o and macroblock m or macroblock sub-partition), R is the bitrate, and $\lambda$ is a parameter defining a trade-off between distortion and rate. Commonly used distortion measures are sum of squared differences (SSD) between original and reconstructed pixels or sum of absolute differences (SAD) between the original and predicted pixels.

In this application solving the Lagrangian optimization problem means finding the encoding mode o which minimizes the Lagrange function J, where the Lagrange function J comprises at least a term representing distortion, a term representing bitrate, and a factor (the "Lagrange multiplier") representing a tradeoff between the two. As the encoding mode o is varied towards more thorough or better quality encoding modes then the distortion term D will decrease. However, at the same time the rate term R will increase, and at a certain point dependent on $\lambda$ the increase in R will outweigh the decrease in D. Hence the expression J will have some minimum value, and the encoding mode o at which this occurs is considered the optimal encoding mode.

In this sense the bitrate R, or rather the term $\lambda R$, places a constraint on the optimization in that this term pulls the optimal encoding mode back from ever increasing quality. The mode at which this optimal balance is found will depend on $\lambda$, and hence $\lambda$ may be considered to represent a tradeoff between bitrate and distortion.

The Lagrangian optimization is commonly used in the process of choosing coding decisions, and is applied for every frame region (e.g. every macroblock of 16×16 pixels). Commonly, the distortion may be evaluated to account for all processing stages. These include prediction, transform, and quantization. Furthermore, in order to compute reconstructed pixels, steps of inverse quantization, inverse transform, and inverse prediction must be performed. SSD is often preferred as distortion criterion since it results in higher quality compared to SAD. Commonly, the rate also accounts for coding of all needed parameters, including parameters describing prediction and quantized transform coefficients.

In Zhang et al., the authors estimate the potential distortion in the decoder due not only to source coding but also to channel errors, i.e. also a likely distortion that would be experienced due to loss of data when the signal is transmitted over the channel. The estimated potential distortion is then indirectly used to bias the mode selection towards intra coding (if there is a probability of channel errors). This kind of approach may be referred to herein as loss-adaptive rate-distortion optimization (LARDO).

Zhang's "end-to-end" distortion expression is based on the sum of squared differences (SSD) distortion measure and assumes a Bernoulli distribution for losing macroblocks. The optimal macroblock mode $o_{opt}$ is given by:

$$o_{opt} = \operatorname*{argmin}_{o}(D_s(m, o) + D_{ep\_ref}(m, o) + \lambda R(m, o)), \quad (2)$$

where $D_s(m,o)$ denotes the SSD distortion between the original and reconstructed pixels for macroblock m and macroblock mode o, R the total rate, and $\lambda$ the Lagrange multiplier relating the distortion and the rate term. $D_{ep\_ref}(m,o)$ denotes the expected distortion within the reference macroblock in the decoder due to error propagation. $D_{ep\_ref}(m,o)$ thus provides a bias term which bias the optimization toward intra coding if error propagation distortion becomes too large. $D_{ep\_ref}(m,o)$ is zero for the intra coded macroblock modes. The expression $D_s(m,o)+D_{ep\_ref}(m,o)+\lambda R(m,o)$ may be considered an instance of a Lagrange function J. $\operatorname{Argmin}_o$ outputs the value of the argument o for which the value of the expression J is minimum.

In Zhang et al. the term $D_{ep\_ref}(m,o)$ follows the motion of the objects and is calculated from a total distortion map using the current motion vectors. The total expected error propagation distortion map $D_{ep}$ is driven by the performance of the error concealment and is updated after each macroblock mode selection as:

$$D_{ep}(m(k),n+1)=(1-p)D_{ep\_ref}(m(k),n,o_{opt})+p(D_{ec\text{-}rec}(m(k),n,o_{opt})+D_{ec\text{-}ep}(m(k),n)), \quad (3)$$

where n is the frame number, m(k) denotes the $k^{th}$ sub-partition (i.e. block or subblock) of macroblock m, p the probability of packet loss, $D_{ec\text{-}rec}$ denotes the SSD between the reconstructed and error concealed pixels in the encoder, and $D_{ec\text{-}ep}$ the expected SSD between the error concealed pixels in the encoder and decoder.

In Zhang et al. $D_{ep}$ is stored on a 4×4 grid over each macroblock of the frame, i.e. 16 values of $D_{ep}$ per macroblock, so one value of $D_{ep}$ per 4×4 pixel subblock of each macroblock. As shown in FIG. 1c, the computation of $D_{ep\_ref}(m(k),o)$, i.e. the expected error-propagation reference distortion for a subblock k within the macroblock m of frame at time n, is then performed as a weighted sum of the values of $D_{ep}$ from four subblocks from a preceding frame from time n−1. The weights are determined from the motion vector for the block m in question. That is:

$$D_{ep\_ref}(m(k), n) = \sum_{i=1}^{4} w_i D_{ep}(q_i(k_i), n-1), \quad (4)$$

where the weights $w_i$ are proportional to the area of overlap and where $q_i(k_i)$ denotes subblock $k_i$ of macroblock $q_i$ in a preceding frame n−1.

FIG. 1d provides an illustration of the computation of the expected error-propagation reference distortion from a motion vector and an expected error-propagation distortion map, with reference to exemplary subblocks b1 . . . b4 (in this example k corresponds to b1 and i counts through b1 . . . b4).

The RDO based mode-selection process of Zhang et al. could happen to decide to encode any given macroblock using intra coding, so over time this would tend towards refreshing the frame where needed. However, the recovery with LARDO is not fast enough in many cases and therefore it would still be beneficial (perceptually) to send a recovery frame triggered by the loss report. On the other hand, the conventional technique of generating a recovery frame results in high bitrate spikes.

Vadapalli et al., "Low-complexity frame-level joint source-channel distortion optimal, adaptive intra refresh" (Proc. IEEE Workshop on Multimedia Signal Processing, pp. 474-480, 2008) (incorporated herein by reference in its entirety) disclose a technique which supplements the mode-selection process of Zhang et al. with an additional intra-refresh operation to forcibly refresh the frame with a certain determined regularity. The intra-refresh operation generates recovery frames at a certain determined times, but in order to smooth out the bitrate cost of the recovery frames and avoid rate spikes then according to Vadapelli each individual intra-refresh operation is spread over a number of frames. That is, for a given recovery operation, different partial regions of the frame are refreshed in different respective ones of that number of frames. Further, the order in which the frame regions are refreshed is determined based on the error propagation distortion map of Zhang et al., such that regions estimated to have a higher error propagation distortion based on Zhang's a priori probabilistic model of the lossy channel are refreshed first, whilst regions estimated to have a lower error propagation distortion are refreshed later. In Vadapalli et al. the times at which recovery operations are performed are set unilaterally by the encoder, with a regularity that is determined also based on the a priori probabilistic model of the channel.

Yet another alternative approach to smooth the rate over time is to use a so-called pacing buffer. The pacing buffer acts as a low-pass filter on the bursty output rate of the video encoder and thereby producing a more even rate on the transmission channel. The cost of the pacing buffer is delay.

SUMMARY

The inventors of the present invention believe there is further scope for reducing the distorting effect of error propagation whilst maintaining a sufficiently smooth bitrate.

The feedback channel may be used for example to signal that a frame was lost at the receiver. Typically, a lost frame causes severe distortions in the decoded video, that can last for a long time unless actions are taken—such as to report back from the decoder to the encoder that a certain frame was lost and then force the encoder to generate a recovery frame that will stop error propagation when received and decoded, e.g. a key-frame (all intra coded) or a frame that is inter coded with respect to an error-free frame known to be available in the decoder (known due to one or more acknowledgments fed back from the receiver). The latter generally results in a lower bitrate at a given quality compared to the former. The disadvantages associated with sending a recovery frame are bitrate overshoots or alternatively, increase in source coding distortion. Bitrate overshoots can in turn cause new losses or forcing encoder to drop frames and a drastic increase source coding distortion might be perceptually disturbing.

To alleviate the aforementioned problem, the present invention produces partial recovery frames over a period of time instead of generating one complete recovery frame after a loss has been reported. By partial recovery frames is meant the use of techniques such as intra refresh, applied to different partial regions of a frame spread over a number of frames. The intra refresh aims at forcing intra coding of a number of macroblocks in each frame over a period in time, i.e. not all macroblocks at once as in the standard recovery frame scenario. The refresh pattern is preferably arranged such that all macroblock positions are refreshed by intra coding (or inter with respect to frames known to be available within the decoded picture buffer in the decoder) within a certain period of time. This kind of technique may be thought of as a "soft recovery" operation.

According to the present invention, the intra-refresh or other such soft-recovery operation is triggered by feedback from the decoder reporting loss experienced over the channel.

In addition to the use of an intra refresh or other soft-recovery technique for the generation of the recovery frame(s), a particularly preferred embodiment of the present invention drives the intra refresh using the potential distortion (including effects of packet losses) at the decoder as estimated in the encoder. Tracking the potential distortion at the decoder inside the encoder can be implemented for example as disclosed by Zhang et al. The potential distortion in Zhang et al. is constructed as a weighted sum of the potential distortion due to corrupt reference inside the decoder and the distortion introduced if the frame is lost and error concealment is invoked. In Zhang et al. the distortion map is just used in the ongoing mode selection process, but according to the preferred embodiments of the present invention the purpose of the distortion map is to prioritize the order in which blocks are refreshed in the soft-recovery operation or what blocks should be refreshed altogether.

The purpose of recovery is to break all error propagation at once. The purpose of soft-recovery is to relax this a bit and allow for the recovery to happen within a few of frames. Nonetheless, the soft recovery still terminates the error-propagation distortion faster than simply applying the LARDO process of Zhang et al. would generally do that is, the soft recovery ensures that it refreshes the frame area over a certain number of frames that is small relative to the time it would take the LARDO process to happen to cover the area of the frame. The soft recovery aims to refresh the whole image area or at least a whole area of the image (multiple macroblocks together), whereas RDO makes mode selection decisions for each individual block or macroblock in isolation and does not make a systematic refresh of the area in question.

A somewhat similar approach is proposed by Vadapalli et al. However, Vadapalli fails to make use of the possibility of a feedback channel being available.

The processes of Zhang et al. and Vadapelli et al. are both based only on a priori probabilistic assumptions made purely at the encoder about the likelihood of loss over the channel. That is, they each rely on a purely model-based approach using a probabilistic model of the channel. The estimates of distortion rely on a predetermined estimate of the loss probability p without having a posteriori empirical knowledge of the channel.

Further, unlike Zhang et al., a soft recovery operation only occurs at certain times when triggered by a reported lost frame, whereas an RDO approach such as that of Zhang is an ongoing process happening all the time.

Thus the present invention provides for the generation of partial recovery frames (compared to a single all-at-once recovery frame) in order to smooth the sending rate, triggered in response to feedback from the receiving terminal reporting a posteriori information about loss occurring over the channel. In a particularly preferred embodiment, the present invention uses a priority map based on potential distortions in the decoded frame to determine what macroblocks to be refreshed and in what order.

According to one aspect of the present invention there is provided a method comprising: encoding a video image at each of a plurality of frames, including by using inter frame encoding to encode at least portions of some of the frames, thereby generating an encoded video stream; transmitting the encoded video stream over a lossy channel to be decoded at a receiver to produce decoded video; and performing a recovery operation to refresh the encoding of the video image, cutting off error propagation that has occurred in the decoded video due to an effect of inter prediction in presence of loss over said channel; wherein said recovery operation is triggered by a report fed back from the receiver indicative of loss; and wherein the recovery operation is performed over a plural number of frames, refreshing the encoding of different partial frame regions at different respective frames.

In embodiments, the refresh operation may refresh the encoding of the whole of said video image over said number of frames.

The recovery operation may comprise encoding one or more of said partial frame regions using intra frame encoding instead of said inter frame encoding.

The recovery operation may comprise encoding one or more of said partial frame regions using inter prediction relative to a portion of one of said frames that is known to be error free due to acknowledgement of receipt fed back from the receiver.

The method may comprise maintaining an error propagation distortion map mapping a estimates of distortion due to said error propagation over different respective portions of the video image; wherein each of the partial frame regions may encompass one or more of said portions, and the partial frame regions may be refreshed according to a priority determined in dependence on the estimates of distortion in the error propagation distortion map for the different portions.

At each of the respective frames, only one or a subset of the partial frame regions corresponding to a largest estimate of error propagation distortion, based on the estimates for said portions in the error propagation distortion map, may be refreshed. The partial frame regions may be refreshed in an order of priority over said number of frames, the order of priority being determined based on the estimates in the error propagation distortion map, such that partial frame regions corresponding to greater estimated error propagation are refreshed in earlier of said number of frames and partial frame regions corresponding to lesser estimated error propagation are refreshed in later of said number of frames.

All of the portions of the video image may be refreshed in priority order.

Said number of frames may be equal to or greater than the number of said partial frame regions into which the video image is divisible in area.

The method may comprise updating the error propagation map to reflect the refreshing by the recovery operation.

Each of said partial frame regions may encompass a plurality of said portions, and a corresponding estimated error propagation distortion for each partial frame region may be determined based on the estimates for the respective plurality of portions in the error propagation map.

The estimates in the error propagation map may be based on a first contribution representing an estimate of the distortion that would be experienced, if the target portion does arrive over the channel, due to non arrival of a reference portion in the target portion's history from which prediction of the target portion depends, and a second contribution representing an estimate of distortion that would be experienced due to concealment.

The second contribution may comprise a contribution representing a measure of concealment distortion of the target portion relative to an image portion that would be used to conceal loss of the target portion if the target portion is lost over the channel, and a contribution representing an estimate of distortion that would be experienced due to loss of an image portion in the target portion's history upon which concealment of the target portion depends.

In addition to the recovery operation, the error propagation distortion map may additionally be used in a separate encoding mode selection process applied to each image portion individually, and being an ongoing process rather than triggered by feedback from the decoder.

The encoding mode selection process may select between intra and inter coding for individual image portions.

The recovery operation may refresh the encoding of the video image faster than the mode selection process.

The recovery operation may refresh the encoding of the whole video image within a predetermined time period defined by said number of frames, whereas the mode selection process may not guarantee to refresh the encoding of the whole video image within the predetermined time period.

The mode selection process may not guarantee to refresh the encoding of the whole video image within any predetermined time period.

According to another aspect of the present invention there is provided a transmitting terminal comprising: an encoder arranged to encode a video image at each of a plurality of frames, including by using inter frame encoding to encode at least portions of some of the frames, thereby generating an encoded video stream; and a transmitter arranged to transmit the encoded video stream over a lossy channel to be decoded at a receiving terminal to produce decoded video; wherein the encoder is configured to perform a recovery operation to refresh the encoding of the video image, cutting off error propagation that has occurred in the decoded video due to an effect of inter prediction in presence of loss over said channel; wherein the encoder is configured such that said recovery operation is triggered by a report fed back from the receiving terminal indicative of loss; and wherein the encoder is configured to perform said recovery operation over a plural number of frames, refreshing the encoding of different partial frame regions at different respective frames.

In embodiments the encoder may be further configured to perform operations in accordance with any of the above method features.

According to another aspect of the present invention, there is provided a computer program product embodied on a non-transitory computer readable medium and comprising code configured so as when executed on a transmitting terminal to perform operations of: encoding a video image at each of a plurality of frames, including by using inter frame encoding to encode at least portions of some of the frames, thereby generating an encoded video stream; transmitting the encoded video stream over a lossy channel to be decoded at a receiver to produce decoded video; and performing a recovery operation to refresh the encoding of the video image, cutting off error propagation that has occurred in the decoded video due to an effect of inter prediction in presence of loss over said channel; wherein said recovery operation is triggered by a report fed back from the receiver indicative of loss; and wherein the recovery operation is performed over a plural number of frames, refreshing the encoding of different partial frame regions at different respective frames.

In embodiments the code may be further configured so as when executed to perform operations in accordance with any of the above method features.

The invention may be particularly (but not exclusively) applicable when encoding a video stream in real-time, i.e. a live video stream such as that of a video call, where the encoder has to dynamically encode the stream for transmission as-and-when it is received from the camera or such like.

BRIEF DESCRIPTION OF THE DRAWINGS

For a better understanding of the present invention and to show how it may be put into effect, reference is made by way of example to the accompanying drawings in which:

FIG. 4 is a schematic representation of an error propagation distortion map.

DETAILED DESCRIPTION

The following relates to the field of real-time video transmission over an erroneous channel with a feedback channel available from the receiver to the transmitter.

Figure 2:
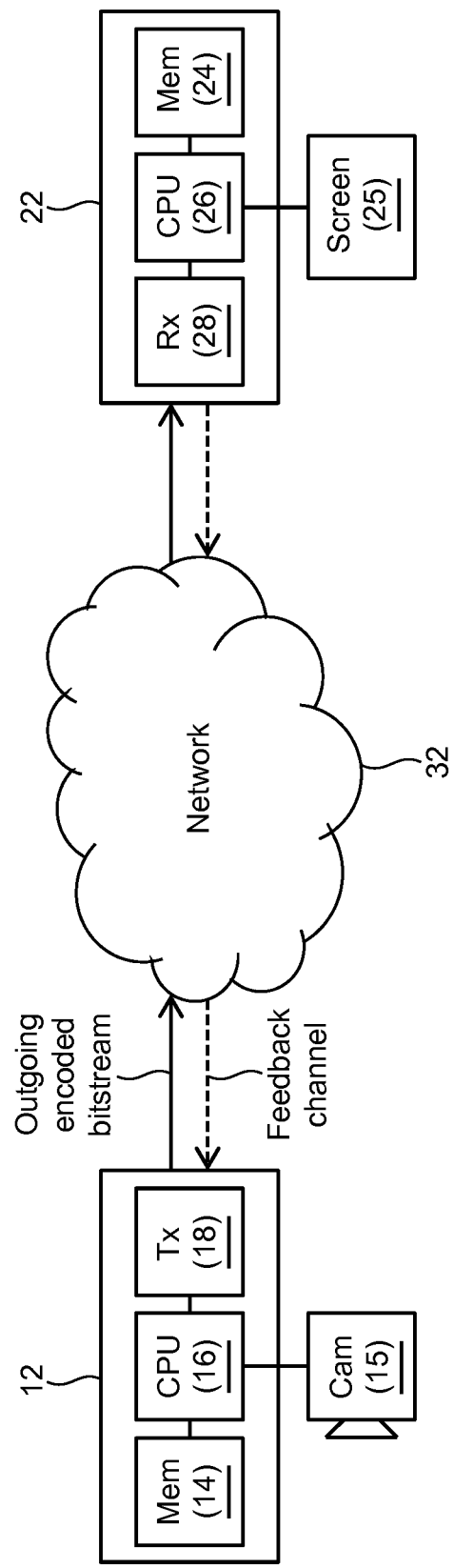
FIG. 2 is a schematic block diagram of a communication system.

An example communication system in which video coding may be employed is illustrated schematically in the block diagram of FIG. 2. The communication system comprises a first, transmitting terminal 12 and a second, receiving terminal 22. For example, each terminal 12, 22 may comprise a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area Internet and/or local area network, and/or a mobile cellular network.

The first terminal 12 comprises a storage medium 14 such as a flash memory or other electronic memory, a magnetic storage device, and/or an optical storage device. The first terminal 12 also comprises a processing apparatus 16 in the form of a CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

In some systems, the decoder at the receiving terminal 22 may be arranged to send feedback to the encoder of the transmitting terminal 12 via a feedback channel, preferably via the same packet-based network 32.

In a conventional system, the feedback channel may be used to signal back to the encoder on the transmitting terminal 12 that a frame was experienced as lost at the receiving terminal 22 (a loss report). The feedback channel may also be used to signal back to the encoder that a frame was successfully received at the receiving terminal 22 (an acknowledgement). Typically, a lost frame causes severe distortions in the decoded video, that can last for a long time unless actions are taken. One such action is to report back from the decoder to the encoder that a certain frame was lost and then force the encoder to generate a "recovery frame" that will stop error propagation when received and decoded. The recovery frame can be for example a key-frame (i.e. all intra coded) or a frame that is inter coded with respect to an error-free frame known to be available in the decoder (known to be error free because it has itself been acknowledged as received and anything else relevant in its history has been acknowledged). The latter generally results in a lower bitrate at a given quality compared to the former. The disadvantages associated with sending a recovery frame are bitrate overshoots (rate spikes) or alternatively an increase in source coding distortion. Bitrate overshoots can in turn cause new losses or forcing encoder to drop frames and a drastic increase source coding distortion might be perceptually disturbing.

A different approach is taken by Zhang et al. Zhang et al. does not use recovery frames, but rather performs a mode selection process which selects between different encoding modes (including intra and inter encoding modes) in a manner that attempts to optimize a rate-distortion trade-off based on an a priori probabilistic model of the channel.

Referring again to FIG. 2, the decoder being run on the receiving terminal 22 is configured to report back to the encoder running on the transmitting terminal 12 when it determines that a frame or part of a frame has not been received at the receiving terminal 22, and is therefore lost over the channel. The loss could be because a packet has been dropped during transmission over the packet-based network, or because data is corrupted. The decoder on the receiving terminal 22 may also feed back acknowledgments when packets, frames or parts of frames have been successfully received.

According to a preferred embodiment of the invention, there is described a method of using intra refresh based recovery or other such soft recovery operation instead of a single recovery frame, wherein the intra-refresh based recovery operation performed at the encoder of the transmitting terminal 12 is triggered by a loss report received back from the receiving terminal 22.

There are a number of challenges in connection with an intra refresh based recovery scheme. First, it would be desirable to refresh the regions that are associated with the largest distortion first such that the duration of (severe) distortions is minimized. Second, it would be desirable to ensure that after a certain period of time the probability of error propagation distortion (unless new losses have occurred) is small. To address these two problems, it would be useful to track the potential decoder distortion inside the encoder. One such method for tracking distortion is that described by Zhang et al., but others may be possible. The tracking comprises maintaining an error propagation distortion map at the encoder running on the transmitting terminal 12. This maps estimates of distortion due to possible loss over the channel to different respective portions of the frame area of the video image in question, e.g. mapping a respective estimated error propagation distortion value to each macroblock of the frame area.

The present invention uses the estimated distortion values in the error propagation map to prioritize which regions of the frame should be refreshed in the soft recovery operation, preferably prioritizing the order in which the regions are refreshed over the number of frames involved in the soft-recovery. Those regions having larger estimates of error propagation distortion will be refreshed first, and those regions having lower estimates of error propagation will be refreshed later in the sequence. However, unlike Vadapalli et al., the soft recovery operation is triggered by a report fed back from the receiving terminal 22 indicative of loss over the channel (e.g. the channel established via packet-based network 32). Preferably the trigger is a report corresponding to a specific loss event, i.e. the loss of a particular packet, frame or part of a frame.

The refreshing of a given region of a frame can be achieved using either intra encoding, or inter encoding relative to an error-free frame known to be available in the decoder (known to be error free because it has itself been acknowledged as received and anything relevant in its history has been acknowledged).

Preferably the soft-recovery operation continues until all the regions of the whole frame area, i.e. the area of the whole video image, have been refreshed.

FIG. 4 schematically represents a "snapshot" of an error propagation map being maintained by the encoder at the transmitting terminal 12, at a time when a refresh is triggered by a feedback report from the receiving terminal 22.

Illustrated in FIG. 4 are a plurality of entries in an error propagation distortion map, each corresponding to a respective portion of the total frame area at a different respective position within the frame area. For example the map may maintain one entry per block or sub-block m(k) of macroblock m. Each of the entries stores a respective value $D_{ep}(m(k))$ representing a respective estimate of error propagation distortion for its respective frame portion. This represents the distortion that is estimated might currently be experienced at the decoder in that portion of the frame area due to possible loss of the relevant encoded image data over the channel, and due to an effect of that loss propagating through ongoing frames because of continued decoding of inter coded frames based on error concealed data. The map is determined according to an estimate or model of the channel implemented at the encoder. The relevant entries are updated each time a new encoding mode selection or refresh of a frame region is performed.

According to an exemplary embodiment of the present invention, when triggered by a report of loss fed back from the receiving terminal 22, the encoder at the transmitting terminal 12 determines a relative prioritization for the refreshing of the different portions of the frame area, e.g. for the different blocks or macroblocks, based on which have the highest estimated error propagation distortion in the error propagation map.

Figure 5:
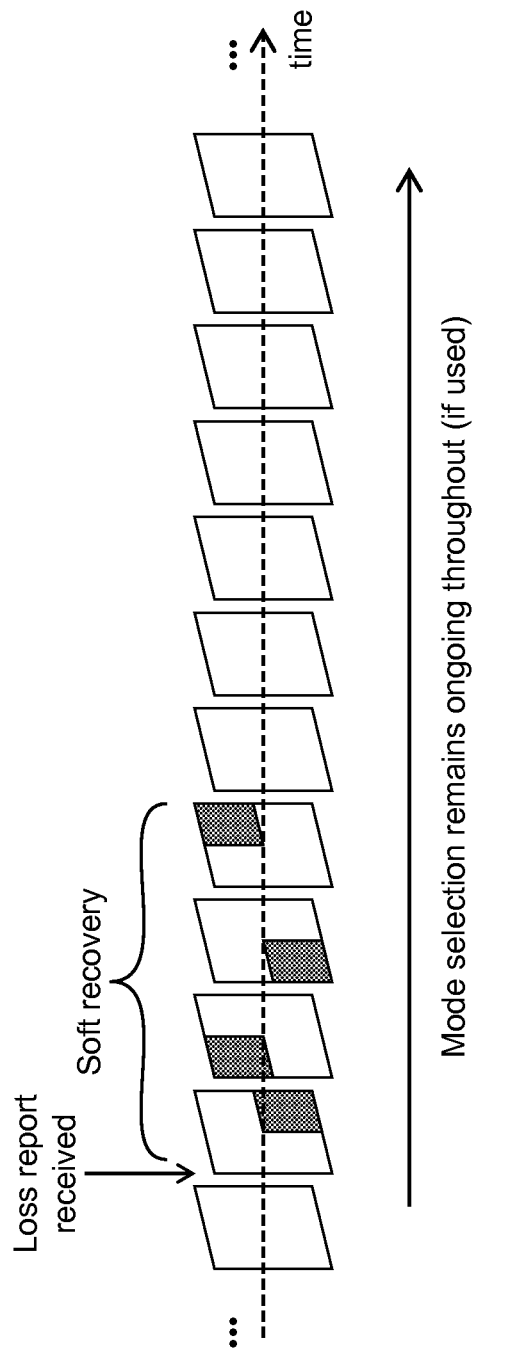
FIG. 5 is a schematic representation of the triggering of a soft recovery operation.

FIG. 5 schematically illustrates a sequence of frames being encoded. As shown in FIG. 5, the soft recovery operation is performed over a small number of partial recovery frames following being triggered in response to a loss report fed back from the decoder reporting loss of a particular packet, frame, or part of a frame. Preferably the partial recovery frames of a given recovery operation form a contiguous sequence in time. The number of frames over which the soft recovery is performed is small relative to the time it would take a LARDO mode selection process to happen to refresh the whole frame. By way of illustration the soft-recovery is shown as being performed over four frames in FIG. 5, but it will be appreciated that other numbers are possible. In embodiments the number is a fixed or otherwise predetermined number, but the possibility of a number that varies ad hoc is not excluded.

Based on the determined prioritization, the encoder then determines which partial regions of the frame, e.g. which groups of blocks or macroblocks, will be refreshed in which of the frames allocated for the recovery.

The refreshing may comprise intra encoding the blocks of a frame region; or may comprise inter encoding the blocks relative to a reference frame or part of a frame that is known to have been received at the decoder with no error propagation distortion, because that reference frame is acknowledged to have been received by the decoder and anything relevant in the reference frame's history is acknowledge to have been received (i.e. if the reference frame was itself inter predicted from a preceding reference frame, and so on, then all the reference frames in the chain will need to be acknowledged as received by the decoder to guarantee no error propagation distortion). The refreshing could also comprise a combination of these two techniques for different regions.

By way of illustration, in FIG. 4 a set of blocks having the highest estimated error propagation distortion values are shown in bold.

In one embodiment, this set of blocks or macroblocks having the highest estimated error propagation distortion forms the region to be refreshed first, e.g. by each being inter encoded relative to an acknowledged error-free frame or part of a frame. However, the blocks having the highest estimated values in the map may not necessarily be adjacent one another, and may be scattered about so that the region being refreshed is dispersed over the map. This may not be convenient if the desired refresh technique is intra encoding those blocks relative to one another.

In an alternative embodiment, the encoder determines a larger region of spatially grouped, contiguous blocks or macroblocks (but still a partial region of the frame) that has the highest overall estimated error propagation distortion according to some aggregate measure, e.g. the containing largest fraction of the set of highest-distortion blocks, or having the highest average of the error propagation distortion values of the blocks within that region. An example of such a region is shown outlined in FIG. 4. The encoder would then refresh the blocks of this region first, rather than necessarily refreshing all of the individually highest distortion blocks.

Preferably there are as many recovery frames as regions into which the frame area is divisible, so that the whole frame area can be refreshed in that number of partial recovery frames. Note in fact that in embodiments, this is just the minimum number of frames, because refreshed portions can in principle be corrupted again due error propagation from non refreshed regions, and thus additional refreshes may be required to guarantee (with some probability) decoding without error propagation distortion.

According to one strategy for refresh prioritization, at each of the number of frames involved in the soft recovery, the encoder may just encode whichever region has the highest estimated distortion at that point in time, without necessarily taking active steps to enforce an exhaustive refresh of the whole frame area over the number of frames. Preferably the error propagation distortion map is updated after each partial frame region is refreshed, i.e. so once that region is refreshed it can be known that that region has little or no error propagation distortion (a low but non-zero expected error propagation distortion may still persist due to a low but existing probability that the partial recovery frame is lost over the channel and so does not have the refreshing effect at the decoder). In this case, the tactic of only refreshing the regions having the largest estimated error propagation distortion values at any given frame may have the effect of refreshing the whole frame area without explicitly allocating or enforcing an order, because after each partial refresh the blocks of the region would have little or no distortion and therefore be unlikely to be refreshed next, and the previously second-highest distortion group of blocks would now be the highest, etc. Hence this strategy will refresh according to a certain implicit priority.

Alternatively, the encoder may be configured to encode whichever region has the highest estimated distortion at the time of each recovery frame, but at the time of each successive recovery frame to exclude from the comparison any regions that have already been refreshed. This would have the effect of ensuring the whole frame area was refreshed in priority order (assuming still that there are at least as many recovery frames as regions into which the frame area is divisible), so that the regions having higher estimated error propagation distortion are refreshed earlier and regions having lower estimated error propagation distortion are refreshed later.

In another alternative strategy, at the beginning of the operation when the soft recovery is initially triggered, the encoder may plan out a priority order for all of the plurality of regions, based on the corresponding estimates in the error propagation distortion map, so that the regions having higher estimated error propagation distortion are allocated a higher priority and regions having lower estimated error propagation distortion are allocated a lower priority. The encoder would then refresh each of the regions in the allocated order of priority.

In some embodiments, any of the above strategies may be further adapted so that one or more regions can be refreshed more than once, either on whole or in part, to try to accommodate for the fact that refreshed portions can in principle be corrupted again due error propagation from non refreshed regions, and thus additional refreshes may be required to guarantee (with some probability) decoding without error propagation distortion. In this case the soft refresh operation would be adapted to run for more frames than the number of said partial frame regions into which the frame area is divisible. In the case of the second or third strategies discussed above, these could be arranged to repeat the refresh for one or more of the regions with the highest estimated error propagation distortion or highest assigned priority.

As discussed, in Zhang et al. the authors estimate in the encoder the potential distortion (due to source coding and channel errors) after decoding. In their work the estimated potential distortion is then indirectly used to bias the mode selection towards intra coding (if there is a nonzero probability of channel errors).

Their so-called end-to-end distortion expression is based on the sum of squared differences (SSD) distortion measure and assumes a Bernoulli distribution for losing macroblocks. The optimal macroblock mode o is given by $$o_{opt} = \underset{o}{\arg\min}(D_s(m, o) + D_{ep\_ref}(m, o) + \lambda R(m, o)), \quad (2)$$

where $D_s(m,o)$ denotes the SSD source coding distortion between the original and reconstructed pixel block for macroblock m and macroblock mode o, R the total rate, and lambda the Lagrange multiplier relating the distortion and the rate term. $D_{ep\text{-}ref}(m,o)$ denotes the expected distortion within the reference block in the decoder due to error propagation. $D_{ep\text{-}ref}(m,o)$ is zero for intra coded macroblock modes (assuming constrained intra prediction). In Zhang et al. the $D_{ep\text{-}ref}(m,o)$ follows the motion and is calculated from a total distortion map using the current motion vectors. The total expected error propagation distortion map $D_{ep}$ is driven by the performance of the error concealment and is updated after each macroblock mode selection as $$D_{ep}(m(k)) = (1-p)D_{ep\_ref}(m(k), o_{opt}) + p \\ (D_{ec\text{-}rec}(m(k), o_{opt}) + D_{ec\text{-}ep}(m(k))), \quad (3a)$$

where m(k) denotes the $k^{th}$ sub-block of macroblock m, p denotes the probability of packet loss, $D_{ec\text{-}rec}$ denotes the SSD between the reconstructed and error concealed pixels in the encoder, and $D_{ec\text{-}ep}$ the expected SSD between the error concealed pixels in the encoder and decoder.

In embodiments of the present invention the use of equation (2) is not crucial. The relevant equation is (3) or (3a) which describes the tracking of the potential distortion. Given equation (3) or (3a) for the whole frame the encoder can choose to refresh the K out of a maximum $K_{max}$ blocks with the largest potential distortion, thus addressing the first concern of minimizing the duration of severe distortions. This is similar to what was proposed by Vadapalli et al. in the context of intra refresh, but is triggered by a loss report fed back from the receiver 12. Furthermore, since the preferred embodiments of the present invention track the distortion from frame to frame, the encoder can be configured to estimate how the refresh of a macroblock propagates to the next frame (or gets corrupted again) and thereby obtain a good estimate of the probability of remaining error propagation distortion in decoded picture.

The soft recovery mechanism is an independent recovery approach that can be used with or without LARDO mode selection. The soft recovery operation of the present invention is distinct from the mode selection process in that a soft refresh operation only happens at certain times when triggered by a reported lost frame, whereas LARDO is an ongoing process happening all the time. See again FIG. 5. Also, the soft refresh aims to refresh the whole image or at least a whole chunk of the image (multiple macroblocks together), whereas LARDO makes mode selection decisions for each individual block or macroblock in isolation.

The LARDO process could happen to decide to encode any given macroblock using intra coding, so over time would tend towards refreshing the frame where needed (albeit conventionally done without feedback). However, the inventors have experienced that the recovery with LARDO is not fast enough in many cases and therefore it is still beneficial (perceptually) to send a recovery frame triggered by the loss report. The purpose of a recovery operation is to break all error propagation at once. The purpose of soft-recovery is to relax this a bit and allow for the recovery to happen within a couple of frames. However, the soft recovery still terminates the error-propagation distortion faster than what simply applying LARDO would do. Preferably the soft-recovery operation guarantees to refresh the whole frame area within a certain predetermined time period, defined by the number of frames over which the soft-refresh is spread; whereas this is something a LARDO process by its nature could not guarantee.

Figure 3:
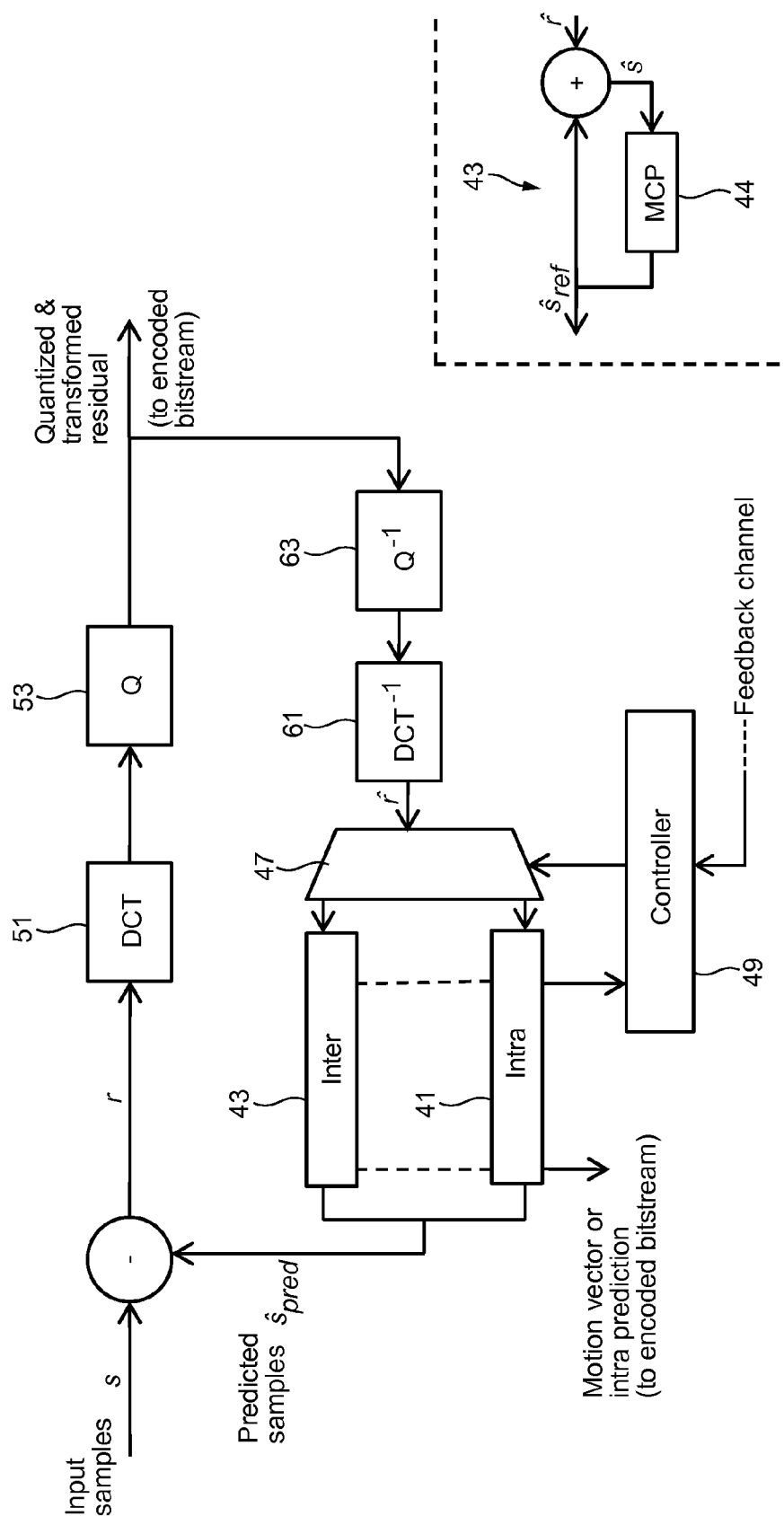
FIG. 3 is a schematic block diagram of an encoder.

A suitable encoder for implementing the present invention is described in relation to FIG. 3.

FIG. 3 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, and a subtraction stage (−). The encoder also comprises a switch 47 and a controller 49. Each of the modules is preferably implemented as a portion of code stored on the transmitting terminal's storage medium 14 and arranged for execution on its processing apparatus 16, though the possibility of some or all of these being wholly or partially implemented in dedicated hardware circuitry is not excluded.

Each of the switch 47 and mode controller 49 is arranged to receive an instance of the input video stream comprising a plurality of macroblocks MB. The controller 49 is arranged to select whether macroblocks are encoded using intra or inter encoding (and in embodiments may select amongst different inter modes and/or different intra modes). The controller 49 is operatively coupled to the multiplexer 47 so as to control it to pass the output of the inverse quantizer 63 to the input of either the intra prediction module 41 or inter prediction module 43 as appropriate to the selected encoding type. The controller 49 uses this ability to control the generation of refreshed frame regions according to the soft recovery operation, e.g. to generate intra encoded regions in the different required positions over the period of the soft refresh. To this end, the controller 49 is connected so as to receive the reports of loss (and optionally also the acknowledgments) fed back from the receiving terminal 22 via the feedback channel. If a LARDO mode-selection process such as that of Zhang et al. is also required in parallel with the soft recovery mechanism, the mode selection "o" for individual macroblocks (or such like) may also be controlled by the controller 49. In embodiments the controller 49 may be arranged to indicate information about the selected mode "o" to the relevant prediction module 41, 43 (e.g. to indicate a 4×4 partition mode, 8×8 mode, skip mode, etc), and to receive information fed back from the prediction module 41, 43 for use in selecting the modes for the next frame.

The output of the intra prediction module 41 or inter prediction module 43 is then coupled on to an input of the subtraction stage (−) which is arranged to receive the unencoded input video stream at its other input and subtract the predicted blocks from their unencoded counterparts, thus generating the residual signal. The residual blocks are then passed through the transform (DCT) module 51 where their residual values are converted into the frequency domain, then to the quantizer 53 where the transformed values are converted to discrete quantization indices. The quantized, transformed signal is fed back though the inverse quantizer 63 and inverse transform module 61 to generate a predicted version of the blocks or subblocks (as would be seen at the decoder) for use by the selected prediction module 41, 43. An indication of the predictions used in the prediction modules 41,43, the motion vectors generated by the inter prediction module 43 and the quantized, transformed indices of the residual as generated by the transform and quantization modules 51, 53 are all output for inclusion in the encoded video stream; typically via a further, lossless encoding stage such as an entropy encoder (not shown) where the prediction values and transformed, quantized indices may be further compressed using lossless encoding techniques known in the art.

By way of example, Zhang's method of maintaining an error propagation distortion map is now described in more detail. However, it will be appreciated that there may be other ways of modelling possible distortion due to loss over a channel, and the present invention is not limited to this specific approach.

As mentioned, mode selection may involve optimizing (e.g. minimizing) a Lagrangian type function:

$$J=D(m,o)+\lambda R(m,o), \qquad (1)$$

where J represents the Lagrange function, D represents a measure of distortion (a function of mode o and macroblock m or macroblock sub-partition), R is the bitrate, and $\lambda$ is a parameter defining a trade-off between distortion and rate.

In a conventional case the distortion term D only takes into account the source coding distortion, i.e. due to imperfections in the encoder such as the distortion introduced by quantization. It does not take into account the distortion that may be introduced due to loss of data over the channel, e.g. due to packet loss in transmission over a packet-based network 32.

On the other hand, loss adaptive techniques such as those of the present invention and Zhang et al. attempt to define a measure of "end-to-end" distortion taking into account both the source encoding and the distortion due to loss of data over the channel. The end-to-end distortion for a given (target) block, macroblock or subblock may be described as:

$$D=(1-p)D_{arrival}+pD_{loss} \qquad (5)$$

where $D_{arrival}$ is an estimate of the distortion that will be experienced if the target block does arrive at the decoder, and $D_{loss}$ is an estimate of the distortion that will be experienced if the target block does not arrive at the decoder due to packet loss over the channel, e.g. due to loss of a packet comprising that block over a packet-based network 32. The parameter p is an estimate of the probability of a loss event occurring over the channel that results in the block or image portion in question being lost, e.g. an estimate of the probability of a packet loss. For convenience the term "block" may be used in places here to refer generally to the relevant level of frame partition (e.g. a block or subblock of certain standards such as H.264).

$D_{arrival}$ represents not only the source coding distortion but also the distortion that will be introduced due to distortion of a block's past, i.e. distortion in one or more reference blocks from which the target block is to be predicted. Therefore $D_{arrival}$ comprises both a source coding distortion term $D_s$ and an error propagation distortion term $D_{ef\_ref}$ which represents a distortion in the predicted target block's history (i.e. distortion in the target blocks' reference block which will carry forward into the target block):

$$D_{arrival} = D_s + D_{ep\text{-}ref} \qquad (6)$$

$D_{loss}$ comprises a loss due to concealment. If a target block is not received then the decoder will apply a concealment algorithm which could involve freezing a previously decoded block, or interpolating or extrapolating from one or more successfully decoded blocks (either from the current frame and/or a previous frame). Therefore $D_{loss}$ can be identified as the distortion due to this concealment process:

$$D_{loss} = D_{ec} \qquad (7)$$

So examining equation (5), the term $D_s$ represents an estimate of the distortion that will be experienced if there is no loss at all, the term $D_{ec}$ represents an estimate of the distortion that will be experienced if the target block is lost, and the term $D_{ep\_ref}$ represents an estimate of the distortion that will be experienced if the target block is successfully received but something in its history is lost (if the target block's reference block is lost, or the reference block's reference block is lost, etc.)

$D_s$ and $D_{ep\_ref}$ are functions of encoding mode selection o. $D_{ec}$ is not a function of mode selection o and so is dropped from the Lagrange expression (it does not matter how a lost block was encoded—it is still lost). Hence the optimization can be written as:

$$o_{opt} = \underset{o}{\mathrm{argmin}}(D_s(m, o) + D_{ep\_ref}(m, o) + \lambda R(m, o)), \qquad (2)$$

$D_s$ is deterministic as it is based on information that can be known at the encoder, for example based on the difference between the raw input sample values s and the reconstructed sample values ŝ. The encoder runs a parallel instance of the decoder at the encoder side (or an approximation of it)—see the inset detailing the inter prediction module 43 in FIG. 3. The inter prediction module 43 comprises a motion compensation prediction (MCP) block 44 and addition stage (+) arranged to determine the reconstructed samples ŝ by combining the predicted samples $\hat{s}_{pred}$ and the reconstructed residual r̂, i.e. $\hat{s}_i = \hat{r}_i + \hat{s}_{pred}$ for each sample index i. In the case of inter encoding, at the encoder the predicted samples $\hat{s}_{pred}$ may be the same as the samples of the reference block $\hat{s}_{ref}$ (the reference block in the reference frame just being offset by the motion vector relative to the target frame—see FIG. 1c, to be discussed again shortly).

Hence the encoder can determine the difference between the actual samples s and the reconstructed samples ŝ as seen at the encoder and decoder end (this so far ignores the possibility of loss which will introduce further distortion experienced at the decoder). The difference in samples may be calculated for example as the sum square difference (SSD) error over all sample indices i of the target block in question:

$$D_s = \sum_i [(s_i - \hat{s}_i)^2] \qquad (8)$$

However, $D_{ep\_ref}$ remains to be estimated, which will be based on making some estimation concerning the channel over which the encoded data is to be transmitted (e.g. over packet-based network 32).

To achieve this, the controller 49 in the encoder may be configured to maintain an error propagation distortion map $D_{ep}$ describing the distortion of each macroblock or partition of a macroblock within the most recently encoded frame. The controller 49 is also arranged to determine a probability p that the packet containing the reference block from which a target block is to be predicted will be lost over the channel (and therefore also to implicitly or explicitly determine a probability 1−p that the packet does arrive). The probability p may be predetermined at the design stage based on statistical modelling, in which case the controller 49 determines p by retrieving a value from memory 14. However, another possibility would be that the controller 49 determines p based on feedback from the receiver 22.

The error propagation map may be expressed as:

$$D_{ep} = (1-p)D_{ep\_arrival} + pD_{loss} \qquad (9)$$

The error propagation map $D_{ep}$ comprises a distortion estimate for macroblock m or more preferably for each sub partition (block or sub-block) m(k) within the most recently encoded frame. Hence it may be more explicitly written as:

$$D_{ep}(m(k)) = (1-p)D_{ep\_arrival}(m(k)) + pD_{loss}(m(k)) \qquad (10)$$

where m(k) denotes the $k^{th}$ sub-partition (e.g. sub-block) of macroblock m and p the probability of packet loss.

$D_{loss}$ is equal to $D_{ec}$ as discussed above. $D_{ep\_arrival}$ represents the differences over the channel, i.e. the difference between the reconstructed samples at the encoder and the reconstructed at the decoder. For example this could be quantified in terms of the sum of squared differences (SSD):

$$D_{ep\_arrival} = \sum_i (\hat{s}_i - \tilde{s}_i)^2 \qquad (11)$$

where $\tilde{s}_i$ are the samples (of indices i) received at the decoder taking into account both the source coding distortion and the distortion due to the channel. I.e. $s_i$ are the raw unencoded input samples, $\hat{s}_i$ are the reconstructed samples at the encoder taking into account the source coding distortion (e.g. due to quantization), and $\tilde{s}_i$ are the samples taking into account the total end-to-end distortion including the lossy effect of the channel; $s_i \rightarrow \hat{s}_i \rightarrow \tilde{s}_i$.

$D_{ep\_arrival}$ can be expanded to:

$$D_{ep\_arrival} = \sum_i ((\hat{s}_{ref} + \hat{r}_i) - (\tilde{s}_{ref} + \tilde{r}_i))^2 \qquad (12)$$

where $\hat{r}_i$ are the samples of the reconstructed residual. Therefore:

$$D_{ep\_arrival} = \sum_i (\hat{s}_{ref} + \tilde{s}_{ref})^2 = D_{ep\_ref} \quad (13)$$

So substituting into equation (9), the error propagation map can be rewritten as:

$$D_{ep} = (1-p)D_{ep\_ref} + pD_{ec} \quad (14)$$

or:

$$D_{ep}(m(k)) = (1-p)D_{ep\_ref}(m(k)) + pD_{ec}(m(k)) \quad (15)$$

Considering the mode optimization problem, it may also be written:

$$D_{ep}(m(k),n+1) = (1-p)D_{ep\_ref}(m(k),n,o_{opt}) + pD_{ec}m(k),n,o_{opt}) \quad (16)$$

where n is the frame number, i.e. $D_{ep}(n+1)$ is the error propagation map to be used for making the mode selection for frame at a time n+1 given the existing decision $o_{opt}$ and distortion $D_{ep}(n)$ map for frame at a preceding time n.

As in Zhang et al., the $D_{ec}$ term may be also expanded:

$$D_{ep}(m(k),n+1) = (1-p)D_{ep\_ref}(m(k),n,o_{opt}) + p(D_{ec\text{-}rec}(m(k),n,o_{opt}) + D_{ec\text{-}ep}(m(k),n)), \quad (3)$$

where $D_{ec\text{-}rec}$ denotes the SSD between the reconstructed and error concealed pixels in the encoder, and $D_{ec\text{-}ep}$ the expected SSD between the error concealed pixels in the encoder and decoder.

Examining equation (3), as explained above, the term $D_{ep\_ref}$ represents the distortion that will be experienced if the target block is successfully received but something in its history is lost (if the target block's reference block is lost, or the reference block's reference block is lost, etc.). Further, $D_{ec\text{-}rec}$ represents an estimate of the distortion due to the nature of the concealment algorithm itself (somewhat analogous to the intrinsic source coding distortion $D_s$ for prediction). $D_{ec\text{-}ep}$ then represents an estimate of the distortion that will be experienced if both the target block is lost (and so needs to be concealed at the decoder) and something in the concealed target block's history is lost (if the block from which concealment is done is lost, or the block from which that block is predicted or concealed is lost, etc.).

So the distortion map $D_{ep}$ comprises a contribution due to new loss, resulting from $D_{ec\text{-}rec}$ and in part from $D_{ec\text{-}ep}$; and a contribution due to past loss, resulting from $D_{ep\_ref}$ and in part also from $D_{ec\text{-}ep}$.

For the first frame in a sequence the frame will be coded with intra coding, in which case $D_{ep\_ref}=0$ and therefore $D_{ep}=pD_{ec}$.

The error concealment distortion $D_{ec}$ is calculated by the controller 49. The term $D_{ec\text{-}rec}$ is based on knowledge of the concealment algorithm, and may depend on the particular error concealment algorithm used. $D_{ec\text{-}ep}$ is calculated based on the existing (most recent) distortion map in a manner analogous to $D_{ep\_ref}$, e.g. by copying the distortion of a co-located block in the case of a basic concealment algorithm or calculating a weighted sum of the distortions from multiple previously encoded blocks b1-b4 if a more complex concealment is used that attempts to extrapolate motion (by analogy see discussion in relation to FIG. 1c below). Other ways of calculating $D_{ec}$ could be used—this could be any estimation of a difference between the reconstructed samples in the encoder and the error concealed samples as would be seen by the decoder (i.e. the samples copied, interpolated or extrapolated from a previous received frame or a received region of the same frame to conceal the lost frame or region).

The controller 49 then maintains the error propagation map for each subsequent inter predicted frame by updating it following each mode selection decision, now including a calculation of $D_{ep\_ref}$ from knowledge of the existing error map. In the case of inter prediction (motion estimation), according to Zhang et al. this is done using the motion vectors for the frame in question.

Figure 1A:
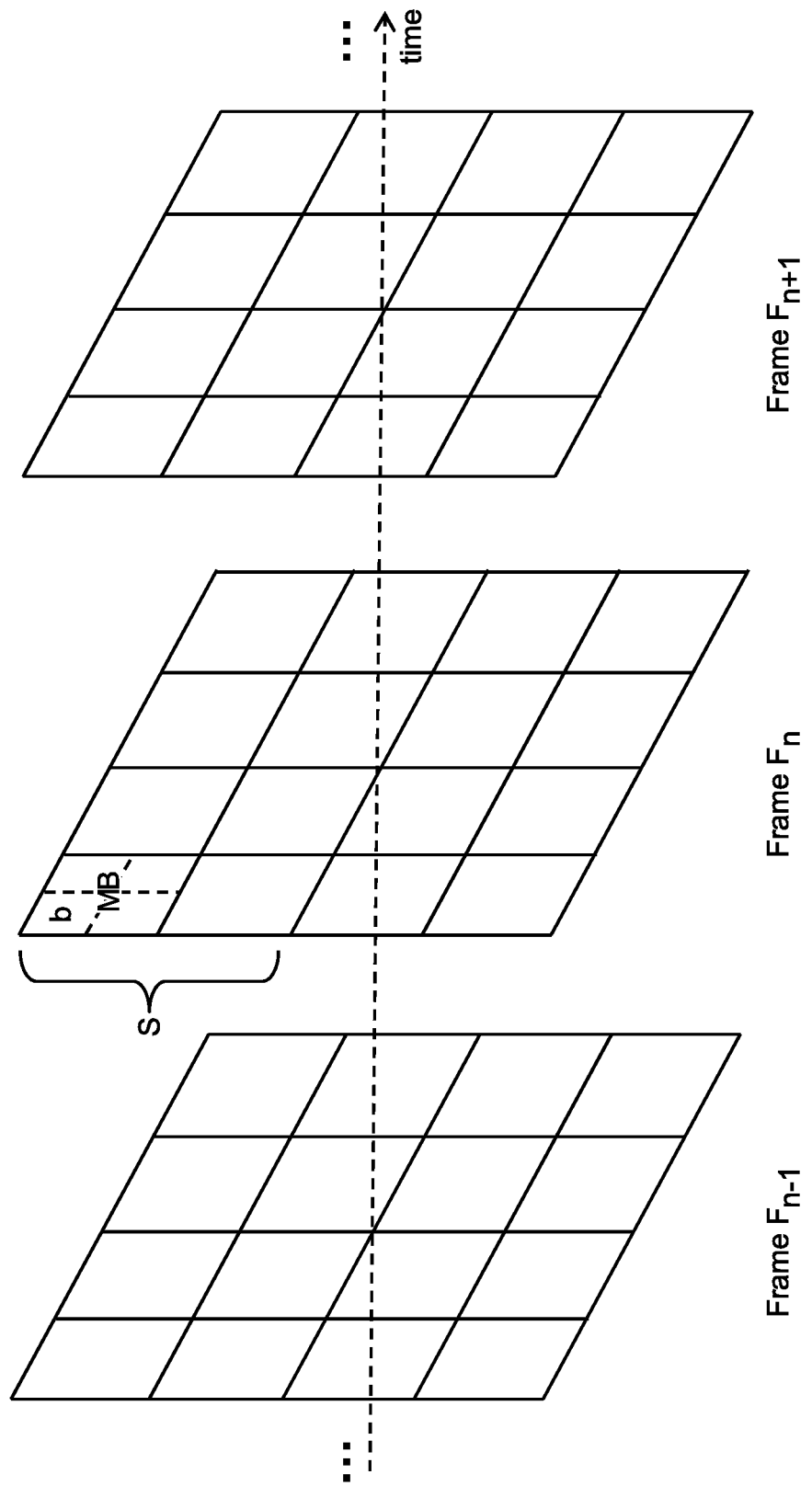
FIG. 1a is a schematic representation of a video stream.
Figure 1B:
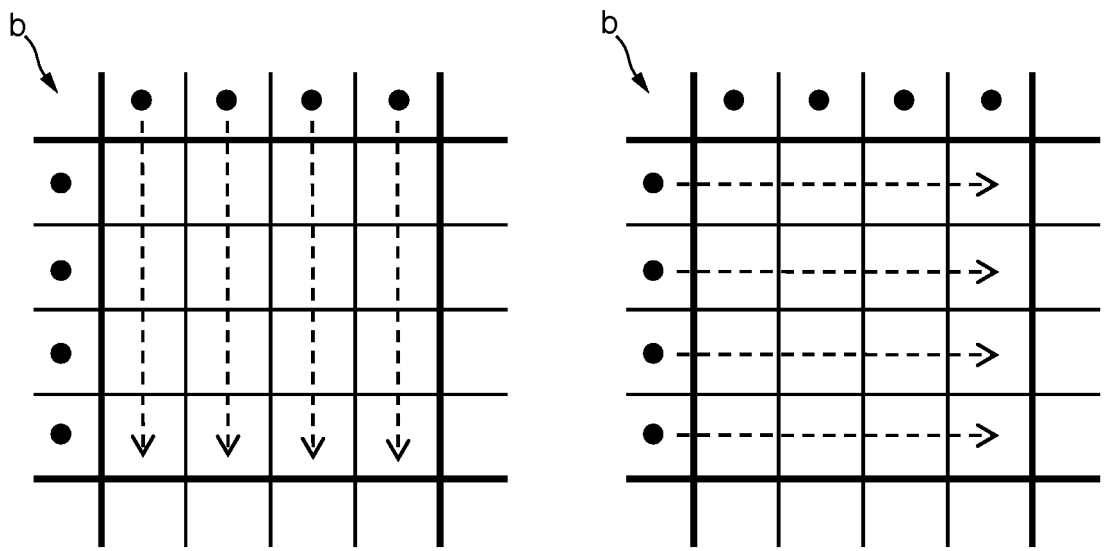
FIG. 1b is a schematic representation of some intra prediction coding modes.
Figure 1C:
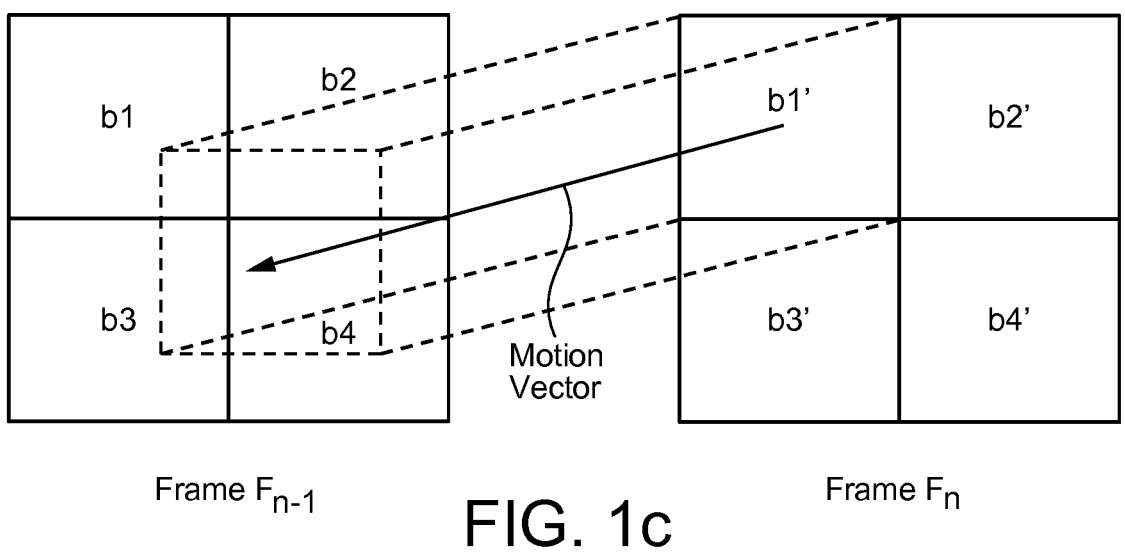
FIG. 1c is a schematic representation on inter prediction coding.
Figure 1D:
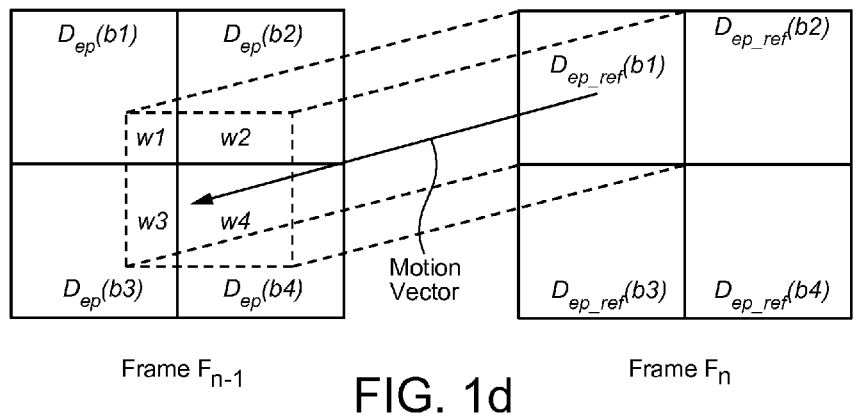
FIG. 1d is a schematic representation of a calculation of error propagation distortion.

An example of this is illustrated in FIG. 1c. Four example blocks b1, b2, b3 and b4 are shown in a reference frame $F_n$ (at time n−1), the reference frame having already been encoded. The blocks of the target frame $F_n$ (at a subsequent time n) are to be predicted from the reference frame $F_{n-1}$. For example consider a target block $b_1$ in the target frame $F_n$. To this end the motion prediction module 44 determines a motion vector defining an offset between the target block in the target frame $F_n$ and a reference block (shown by the dotted line) in the reference frame $F_{n-1}$, such that when the reference block is translated from the offset position in the reference frame $F_{n-1}$ into the position of the target block $b_1$' in the target frame $F_n$ it provides a best estimate of the target block $b_1$. Note therefore that the dotted reference block is not necessarily an indexable block in the reference frame $F_{n-1}$, i.e. is not necessarily a predetermined subdivision of the reference frame, and may be offset by any arbitrary amount (and in fact may even be offset by a fractional number of pixels). Hence the reference block is made up of a contribution from four actual indexable blocks b1, b2, b3 and b4.

Accordingly, the existing calculation performed by the controller 49 to determine $D_{ep\_ref}$ for use in the update of the error propagation map $D_{ep}(n+1)$ comprises calculating a weighted sum of the distortions recorded for blocks or sub-blocks b1 to b4 in the existing map $D_{ep}(n)$:

$$D_{ep\_ref} = \sum_{i=1}^{4} w_i D_{ep}(i) \quad (17)$$

Or more explicitly:

$$D_{ep\_ref}(m(k), n) = \sum_{i=1}^{4} w_i D_{ep}(b_i, n-1), \quad (4a)$$

where $w_i$ is the weight representing the contribution from block or subblock $b_i$ and $D_{ep}(i)$ is the error propagation map entry for block or subblock $b_i$.

As mentioned, in embodiments of the present invention the use of the mode selection equation (2) is not crucial—the soft recovery mechanism is an independent recovery approach that can be used with or without LARDO mode selection. The relevant equation is (3) or (3a) which describes the tracking of the potential distortion. Given equation (3) or (3a) for the whole frame the encoder can choose to refresh the K out of a maximum $K_{max}$ blocks with the largest potential distortion, thus addressing the first concern of minimizing the duration of severe distortions.

It will be appreciated that the above embodiments have been described only by way of example.

For instance, the above has been described in terms of an error propagation map maintained as set out in Zhang et al.

However, other techniques for maintaining an error propagation map may be possible. For example Zhang's technique is based on a predetermined estimate of the probability p of loss over the channel, but other techniques could base the distortion due to loss on actual knowledge of what has been lost, e.g. feedback of value of p being experienced at the decoder, and/or feedback of what actual frames or parts of frames have been lost so that the actual distortion can be known or at least better estimated.

Generally, while the above has been described in terms of slices, macroblocks and blocks or sub-blocks, these terms are not necessarily intended to be limiting and the ideas described herein are not limited to any particular way of dividing or subdividing a frame. Further, the distortion map may cover a whole frame or a region within a frame, and coding decision process may be applied over the whole frame or only for a region within a frame. Note also that the prediction block granularities do not have to be the same as or even connected to the distortion map granularity (though that possibility is not excluded).

The sum of squared differences (SSD) is often preferred as measure of difference since it results in higher quality compared to sum of absolute differences (SAD), but the latter possibility or other possibilities are not excluded and generally the invention could be implemented using any measure of difference between samples as a basis for quantifying distortion.

Commonly, the measure of rate also accounts for coding of all needed parameters, including parameters describing prediction and quantized transform coefficients. This kind of optimization may be referred to herein as full rate-distortion optimization (RDO). In lower complexity embodiments however, the distortion and/or rate term may be approximated by only taking into account the effect of some but not all processing stages, e.g. only taking into account the effect of prediction.

Further, where the present invention is described in terms of two frames n−1 and n, or n and n+1 or such like, according to certain embodiments of the invention it is not necessary for these to refer to two adjacent frames (though that may be the case in existing codecs). In some embodiments it is possible that inter prediction could be performed relative to an even earlier frame, and as such n−1 and n, or n and n+1, may be used in relation to the present invention to refer respectively to any previously encoded frame or image portion and a subsequent frame or portion to be predicted from it.

Note again that where a contribution due to loss is mentioned in this application, or anything stating what happens "if" data lost over the channel or such like, this only relates to a probabilistic assumption (e.g. p) made by the encoder about what might be experienced by the decoder—the encoder of course does not know what will happen. The probabilistic assumption may be predetermined at the design stage based on statistical network modelling, and/or could even be determined dynamically based on feedback from the decoder.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Other variants may become apparent to a person skilled in the art given the disclosure herein. The scope of the invention is not limited by the described embodiments but only by the appendant claims.

What is claimed is:

1. A method comprising:
   encoding a video image at each of a plurality of frames, including by using inter frame encoding to encode at least portions of some of the frames, thereby generating an encoded video stream;
   transmitting the encoded video stream over a lossy channel to be decoded at a receiver to produce decoded video;
   performing a recovery operation to refresh the encoding of the video image, cutting off error propagation that has occurred in the decoded video due to an effect of inter prediction in presence of loss over said channel; and
   maintaining an error propagation distortion map mapping one or more estimates of distortion due to said error propagation over different respective portions of the video image, wherein said recovery operation is triggered by a report fed back from the receiver indicative of loss;
   wherein the recovery operation is performed over a plural number of frames, refreshing the encoding of different partial frame regions at different respective frames, and wherein each of the partial frame regions encompasses one or more of said portions, and the partial frame regions are refreshed according to an order of priority over said number of frames, the order of priority being determined in dependence, at least in part, on the one or more estimates of distortion in the error propagation distortion map for the different portions, such that partial frame regions corresponding to greater estimated error propagation are refreshed in earlier of said number of frames and partial frame regions corresponding to lesser estimated error propagation are refreshed in later of said number of frames.

2. The method of claim 1, wherein the refresh operation refreshes the encoding of the whole of said video image over said number of frames.

3. The method of claim 1, wherein the recovery operation comprises encoding one or more of said partial frame regions using intra frame encoding instead of said inter frame encoding.

4. The method of claim 1, wherein the recovery operation comprises encoding one or more of said partial frame regions using inter prediction relative to a portion of one of said frames that is known to be error free due to acknowledgement of receipt fed back from the receiver.

5. The method of claim 1, wherein at each of the respective frames, only one or a subset of the partial frame regions corresponding to a largest estimate of error propagation distortion, based on the one or more estimates for said portions in the error propagation distortion map, are refreshed.

6. The method of claim 1, wherein said number of frames is equal to or greater than the number of said partial frame regions into which the video image can be divisible in area.

7. The method of claim 1, comprising updating the error propagation map to reflect the refreshing by the recovery operation.

8. The method of claim 1, wherein each of said partial frame regions encompasses a plurality of said portions, and a corresponding estimated error propagation distortion for each partial frame region is determined based on the estimates for the respective plurality of portions in the error propagation map.

9. The method of claim 1, wherein the one or more estimates in the error propagation map are based on a first contribution representing an estimate of the distortion that would be experienced, if the target portion does arrive over the channel, due to non-arrival of a reference portion in the target portion's history from which prediction of the target portion depends, and a second contribution representing an estimate of distortion that would be experienced due to concealment.

10. The method of claim 9, wherein the second contribution comprises a contribution representing a measure of concealment distortion of the target portion relative to an image portion that would be used to conceal loss of the target portion if the target portion is lost over the channel, and a contribution representing an estimate of distortion that would be experienced due to loss of an image portion in the target portion's history upon which concealment of the target portion depends.

11. A transmitting terminal comprising:
an encoder arranged to encode a video image at each of a plurality of frames, including by using inter frame encoding to encode at least portions of some of the frames, thereby generating an encoded video stream; and
a transmitter arranged to transmit the encoded video stream over a lossy channel to be decoded at a receiving terminal to produce decoded video;
wherein the encoder is configured to perform a recovery operation to refresh the encoding of the video image, cutting off error propagation that has occurred in the decoded video due to an effect of inter prediction in presence of loss over said channel;
wherein the encoder is configured such that said recovery operation is triggered by a report fed back from the receiving terminal indicative of loss;
wherein the encoder is configured to perform said recovery operation over a plural number of frames, refreshing the encoding of different partial frame regions at different respective frames;
wherein the transmitting terminal is configured to maintain an error propagation distortion map mapping one or more estimates of distortion due to said error propagation over different respective portions of the video image; and
wherein the encoder is configured such that each of the partial frame regions encompasses one or more of said portions, and the partial frame regions are refreshed according to an order of priority determined in dependence, at least in part, on the one or more estimates of distortion in the error propagation distortion map for the different portions, such that partial frame regions corresponding to greater estimated error propagation are refreshed in earlier of said number of frames and partial frame regions corresponding to lesser estimated error propagation are refreshed in later of said number of frames.

12. The transmitting terminal of claim 11, wherein the encoder is configured such that the refresh operation refreshes the encoding of the whole of said video image over said number of frames.

13. The transmitting terminal of claim 11, wherein the encoder is configured such that the recovery operation comprises encoding one or more of said partial frame regions using intra frame encoding instead of said inter frame encoding.

14. The transmitting terminal of claim 11, wherein the encoder is configured such that the recovery operation comprises encoding one or more of said partial frame regions using inter prediction relative to a portion of one of said frames that is known to be error free due to acknowledgement of receipt fed back from the receiver.

15. A transmitting terminal comprising:
at least one processor; and
g computer program product embodied on at least one computer readable storage memory device, the computer program product comprising code configured so as, responsive to execution by the at least one processor, perform operations comprising:
encoding a video image at each of a plurality of frames, including by using inter frame encoding to encode at least portions of some of the frames, thereby generating an encoded video stream;
transmitting the encoded video stream over a lossy channel to be decoded at a receiver to produce decoded video; and
performing a recovery operation to refresh the encoding of the video image, cutting off error propagation that has occurred in the decoded video due to an effect of inter prediction in presence of loss over said channel;
wherein said recovery operation is triggered by a report fed back from the receiver indicative of loss;
wherein the recovery operation is performed over a plural number of frames, refreshing the encoding of different partial frame regions at different respective frames; and
wherein the partial frame regions are refreshed in an order of priority over said number of frames, the order of priority being determined based, at least in part, on one or more estimates in an error propagation distortion map, such that partial frame regions corresponding to greater estimated error propagation are refreshed in earlier of said number of frames and partial frame regions corresponding to lesser estimated error propagation are refreshed in later of said number of frames.

16. The transmitting terminal of claim 15, wherein the code is further configured such that the refresh operation refreshes the encoding of the whole of said video image over said number of frames.

17. The transmitting terminal of claim 15, wherein the code is further configured such that the recovery operation comprises encoding one or more of said partial frame regions using intra frame encoding instead of said inter frame encoding.

18. The transmitting terminal of claim 15, wherein the code is configured such that the recovery operation comprises encoding one or more of said partial frame regions using inter prediction relative to a portion of one of said frames that is known to be error free due to acknowledgement of receipt fed back from the receiver.

19. The transmitting terminal of claim 15, wherein:
the code is further configured to perform operations comprising maintaining the error propagation distortion map by mapping one or more estimates of distortion due to said error propagation over different respective portions of the video image.

20. A method comprising:

encoding a video image at each of a plurality of frames, including by using inter frame encoding to encode at least portions of some of the frames, thereby generating an encoded video stream;

transmitting the encoded video stream over a lossy channel to be decoded at a receiver to produce decoded video; and performing a recovery operation to refresh the encoding of the video image, cutting off error propagation that has occurred in the decoded video due to an effect of inter prediction in presence of loss over said channel;

wherein said recovery operation is triggered by a report fed back from the receiver indicative of loss;

wherein the recovery operation is performed over a plural number of frames, refreshing the encoding of different partial frame regions at different respective frames; and wherein the partial frame regions are refreshed in an order of priority over said number of frames, the order of priority being determined based, at least in part, on the estimates in the error propagation distortion map, such that partial frame regions corresponding to greater estimated error propagation are refreshed in earlier of said number of frames and partial frame regions corresponding to lesser estimated error propagation are refreshed in later of said number of frames.

21. The method of claim 20, wherein the refresh operation refreshes the encoding of the whole of said video image over said number of frames.

22. The method of claim 20, wherein the recovery operation comprises encoding one or more of said partial frame regions using intra frame encoding instead of said inter frame encoding.

23. The method of claim 20, wherein the recovery operation comprises encoding one or more of said partial frame regions using inter prediction relative to a portion of one of said frames that is known to be error free due to acknowledgement of receipt fed back from the receiver.

24. The method of claim 20, wherein at each of the respective frames, only one or a subset of the partial frame regions corresponding to a largest estimate of error propagation distortion, based on the estimates for said portions in the error propagation distortion map, are refreshed.

25. The method of claim 20, wherein said number of frames is equal to or greater than the number of said partial frame regions into which the video image can be divisible in area.

26. The method of claim 20, comprising updating the error propagation map to reflect the refreshing by the recovery operation.

27. The method of claim 20, wherein each of said partial frame regions encompasses a plurality of said portions, and a corresponding estimated error propagation distortion for each partial frame region is determined based, at least in part, on estimates for the respective plurality of portions in the error propagation map.

28. The method of claim 20, wherein the estimates in the error propagation map are based on a first contribution representing an estimate of the distortion that would be experienced, if the target portion does arrive over the channel, due to non-arrival of a reference portion in the target portion's history from which prediction of the target portion depends, and a second contribution representing an estimate of distortion that would be experienced due to concealment.

29. The method of claim 28, wherein the second contribution comprises a contribution representing a measure of concealment distortion of the target portion relative to an image portion that would be used to conceal loss of the target portion if the target portion is lost over the channel, and a contribution representing an estimate of distortion that would be experienced due to loss of an image portion in the target portion's history upon which concealment of the target portion depends.

* * * * *